United States Patent
Baer et al.

(10) Patent No.: US 10,511,584 B1
(45) Date of Patent: Dec. 17, 2019

(54) MULTI-TENANT SECURE BASTION

(71) Applicant: Amazon Technologies, Inc., Reno, NV (US)

(72) Inventors: Graeme David Baer, Bellevue, WA (US); Conor Patrick Cahill, Waterford, VA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 276 days.

(21) Appl. No.: 15/280,692

(22) Filed: Sep. 29, 2016

(51) Int. Cl.
*H04L 9/32* (2006.01)
*H04L 29/06* (2006.01)

(52) U.S. Cl.
CPC ............ *H04L 63/08* (2013.01); *H04L 63/029* (2013.01); *H04L 63/06* (2013.01); *H04L 63/10* (2013.01); *H04L 63/168* (2013.01); *H04L 63/18* (2013.01); *H04L 63/205* (2013.01); *H04L 63/0272* (2013.01)

(58) Field of Classification Search
CPC ............ H04L 63/0272; H04L 63/0281; H04L 63/029; H04L 63/08; H04L 63/0876; H04L 63/105; H04L 67/28; H04L 12/4633
USPC .............................. 726/5–7, 12, 15; 713/171
See application file for complete search history.

(56) References Cited

U.S. PATENT DOCUMENTS

| | | | |
|---|---|---|---|
| 9,148,414 B1 * | 9/2015 | Roth | H04L 63/08 |
| 9,485,234 B1 * | 11/2016 | Roth | H04L 63/20 |
| 9,509,662 B2 * | 11/2016 | Mudigonda | H04L 63/0272 |
| 9,560,036 B2 * | 1/2017 | Hinton | H04L 9/3228 |
| 9,934,060 B2 * | 4/2018 | Thakkar | H04L 41/0813 |
| 2017/0026355 A1 * | 1/2017 | Mathaiyan | H04L 63/08 |

* cited by examiner

*Primary Examiner* — Samson B Lemma
(74) *Attorney, Agent, or Firm* — Hogan Lovells US, LLP

(57) ABSTRACT

A secure shell (SSH) bastion service can proxy customer SSH traffic through SSH host resources before routing the traffic to the target resource instances in a customer allocation of a multi-tenant environment. The bastion service supports connections directly from a customer allocation management console, which enables the specification of a target instance and selection of an option to establish a secure connection to that instance. The bastion service handles authentication and authorization, ensuring that all security requirements are satisfied. An SSH server of the bastion service can route the traffic to the target instance using the appropriate port for SSH traffic. A second SSH connection is established from the bastion service to the SSH server executing on the target instance, providing end-to-end security of traffic from the client device to the target instance of the customer allocation.

20 Claims, 6 Drawing Sheets

MULTI-TENANT SECURE BASTION

BACKGROUND

Users are increasingly performing tasks using remote computing resources, which may be offered through a shared-resource environment. This has many advantages, as users do not have to purchase and maintain dedicated hardware and software, and instead can pay for only those resources that are utilized at any given time, where those resources typically will be managed by a resource provider. Users can perform tasks such as storing data or executing applications using various types of resources offered by the resource provider. In many cases a user might want to utilize a secure connection, such as a secure shell (SSH) connection, for purposes such as secure login over a network over which the user may otherwise have little control. For multi-tenant environments, however, the use of SSH connections can require specific SSH keys to be defined with per-user authentication and authorization. This approach can be cumbersome to manage and does not take advantage of the multi-tenant nature of the environment.

BRIEF DESCRIPTION OF THE DRAWINGS

Various embodiments in accordance with the present disclosure will be described with reference to the drawings, in which.

DETAILED DESCRIPTION

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Approaches in accordance with various embodiments provide for the management of secure connections, such as secure shell (SSH) connections or remote desktop protocol (RDP) connections, in a multi-tenant environment. A customer of a resource provider environment may have various resource instances executing as part of a customer allocation, which functions as a virtual private network in the resource provider environment. An SSH bastion service can be operated in the resource provider environment that provides authentication and authorization of the connection request and establishes separate SSH connections with target resource instances of the customer allocation. In many embodiments, existing customer credentials for the environment can be used to authenticate the customer for purposes of establishing the SSH connection.

An SSH bastion service can proxy customer SSH traffic through one or more SSH host resources before routing the traffic to the relevant instances. A bastion service can support connections directly from a customer allocation management console (e.g., a management UI or command line interface), or other such component. A customer accessing such a console can specify an instance and select an option to establish a secure connection to that instance. A customer client can first establish an SSH connection to the bastion service, and an authentication can be performed using an access credential, such as a public key, stored for the customer. An SSH server of the bastion service can route the traffic to the target instance using, for example, port 22 for SSH traffic. A second SSH connection can be established from the client device through the bastion service and the determined network path to the SSH server executing on the target instance, providing end-to-end security of traffic from the client device to the target instance of the customer allocation.

Various other functions can be implemented within the various embodiments as well as discussed and suggested elsewhere herein.

Figure 1:
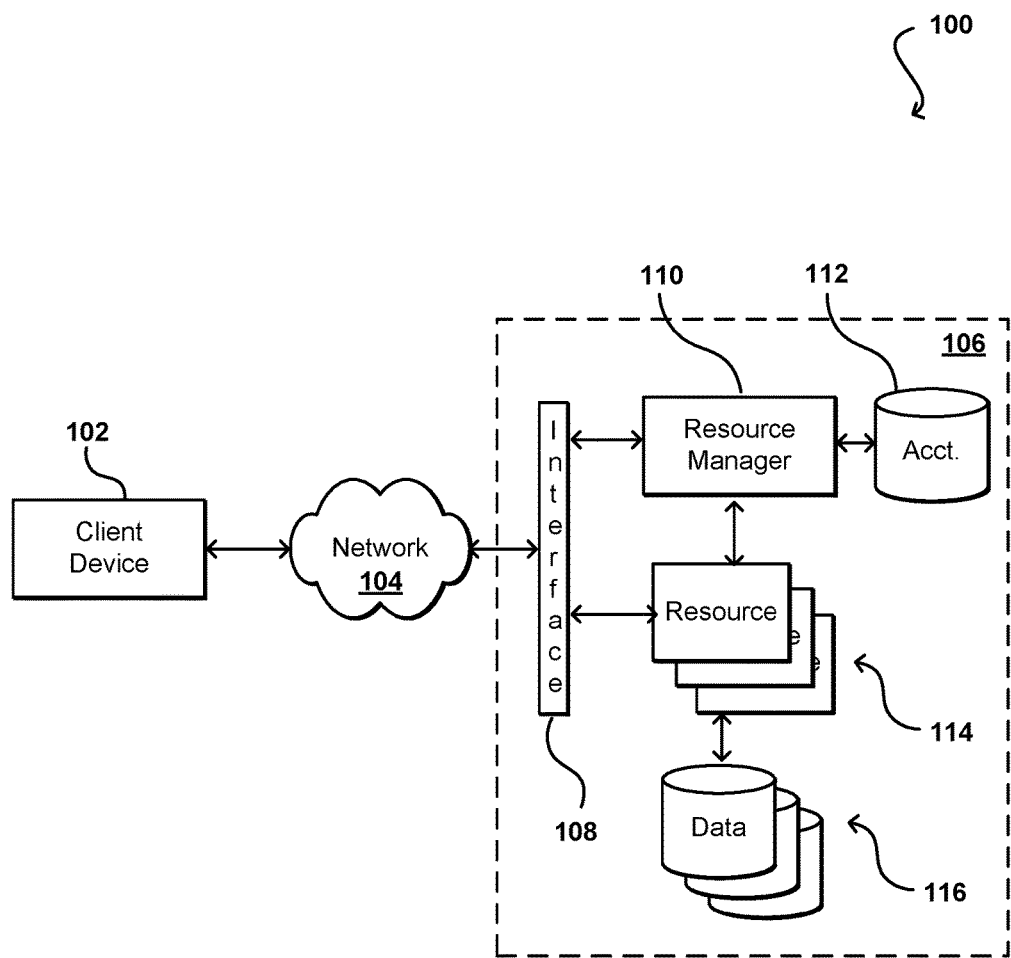
FIG. 1 illustrates an example environment in which various embodiments can be implemented.

FIG. 1 illustrates an example environment 100 in which aspects of the various embodiments can be implemented. In this example a user is able to utilize a client device 102 to submit requests across at least one network 104 to a resource provider environment 106. The client device can include any appropriate electronic device operable to send and receive requests, messages, or other such information over an appropriate network and convey information back to a user of the device. Examples of such client devices include personal computers, tablet computers, smart phones, notebook computers, and the like. The at least one network 104 can include any appropriate network, including an intranet, the Internet, a cellular network, a local area network (LAN), or any other such network or combination, and communication over the network can be enabled via wired and/or wireless connections. The resource provider environment 106 can include any appropriate components for receiving requests and returning information or performing actions in response to those requests. As an example, the provider environment might include Web servers and/or application servers for receiving and processing requests, then returning data, Web pages, video, audio, or other such content or information in response to the request.

In various embodiments, the provider environment may include various types of resources that can be utilized by multiple users for a variety of different purposes. In at least some embodiments, all or a portion of a given resource or set of resources might be allocated to a particular user or allocated for a particular task, for at least a determined period of time. The sharing of these multi-tenant resources from a provider environment is often referred to as resource sharing, Web services, or "cloud computing," among other such terms and depending upon the specific environment and/or implementation. In this example the provider environment includes a plurality of resources 114 of one or more types. These types can include, for example, application servers operable to process instructions provided by a user or database servers operable to process data stored in one or more data stores 116 in response to a user request. As known for such purposes, the user can also reserve at least a portion of the data storage in a given data store. Methods for enabling a user to reserve various resources and resource instances are well known in the art, such that detailed description of the entire process, and explanation of all possible components, will not be discussed in detail herein.

In at least some embodiments, a user wanting to utilize a portion of the resources 114 can submit a request that is received to an interface layer 108 of the provider environment 106. The interface layer can include application programming interfaces (APIs) or other exposed interfaces enabling a user to submit requests to the provider environment. The interface layer 108 in this example can also include other components as well, such as at least one Web server, routing components, load balancers, and the like. When a request to provision a resource is received to the interface layer 108, information for the request can be directed to a resource manager 110 or other such system, service, or component configured to manage user accounts and information, resource provisioning and usage, and other such aspects. A resource manager 110 receiving the request can perform tasks such as to authenticate an identity of the user submitting the request, as well as to determine whether that user has an existing account with the resource provider, where the account data may be stored in at least one data store 112 in the provider environment. A user can provide any of various types of credentials in order to authenticate an identity of the user to the provider. These credentials can include, for example, a username and password pair, biometric data, a digital signature, or other such information. The provider can validate this information against information stored for the user. If the user has an account with the appropriate permissions, status, etc., the resource manager can determine whether there are adequate resources available to suit the user's request, and if so can provision the resources or otherwise grant access to the corresponding portion of those resources for use by the user for an amount specified by the request. This amount can include, for example, capacity to process a single request or perform a single task, a specified period of time, or a recurring/renewable period, among other such values. If the user does not have a valid account with the provider, the user account does not enable access to the type of resources specified in the request, or another such reason is preventing the user from obtaining access to such resources, a communication can be sent to the user to enable the user to create or modify an account, or change the resources specified in the request, among other such options.

Once the user is authenticated, the account verified, and the resources allocated, the user can utilize the allocated resource(s) for the specified capacity, amount of data transfer, period of time, or other such value. In at least some embodiments, a user might provide a session token or other such credentials with subsequent requests in order to enable those requests to be processed on that user session. The user can receive a resource identifier, specific address, or other such information that can enable the client device 102 to communicate with an allocated resource without having to communicate with the resource manager 110, at least until such time as a relevant aspect of the user account changes, the user is no longer granted access to the resource, or another such aspect changes.

The resource manager 110 (or another such system or service) in this example can also function as a virtual layer of hardware and software components that handles control functions in addition to management actions, as may include provisioning, scaling, replication, etc. The resource manager can utilize dedicated APIs in the interface layer 108, where each API can be provided to receive requests for at least one specific action to be performed with respect to the data environment, such as to provision, scale, clone, or hibernate an instance. Upon receiving a request to one of the APIs, a Web services portion of the interface layer can parse or otherwise analyze the request to determine the steps or actions needed to act on or process the call. For example, a Web service call might be received that includes a request to create a data repository.

An interface layer 108 in at least one embodiment includes a scalable set of customer-facing servers that can provide the various APIs and return the appropriate responses based on the API specifications. The interface layer also can include at least one API service layer that in one embodiment consists of stateless, replicated servers which process the externally-facing customer APIs. The interface layer can be responsible for Web service front end features such as authenticating customers based on credentials, authorizing the customer, throttling customer requests to the API servers, validating user input, and marshalling or unmarshalling requests and responses. The API layer also can be responsible for reading and writing database configuration data to/from the administration data store, in response to the API calls. In many embodiments, the Web services layer and/or API service layer will be the only externally visible component, or the only component that is visible to, and accessible by, customers of the control service. The servers of the Web services layer can be stateless and scaled horizontally as known in the art. API servers, as well as the persistent data store, can be spread across multiple data centers in a region, for example, such that the servers are resilient to single data center failures.

As mentioned, such an environment enables organizations to obtain and configure computing resources over a network such as the Internet to perform various types of computing operations (e.g., execute code, including threads, programs, software, routines, subroutines, processes, etc.). Thus, developers can quickly purchase or otherwise acquire a desired amount of computing resources without having to worry about acquiring physical machines. Such computing resources are typically purchased in the form of virtual computing resources, or virtual machine instances. These instances of virtual machines, which are hosted on physical computing devices with their own operating systems and other software components, can be utilized in the same manner as physical computers.

Figure 2:
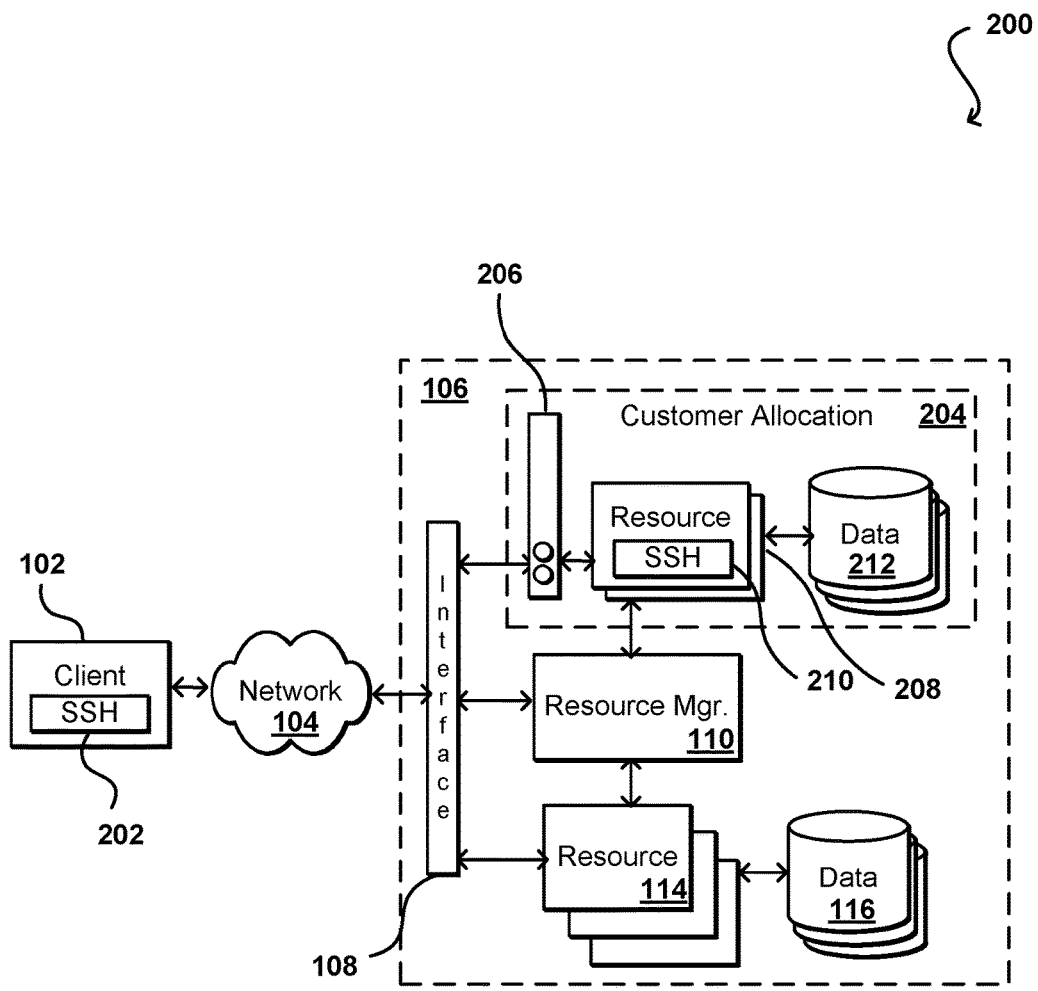
FIG. 2 illustrates a first example configuration for enabling an SSH connection between a client device and a customer resource that can be utilized in accordance with various embodiments.

As mentioned, a customer might have an allocation 204 of resources in such an environment 106, where the resources can include both physical resources (e.g., bare metal host machines) and virtual resources (e.g., virtual machines). The allocations can be under the control of the customer, such that the allocations can function as a sub-network or virtual private cloud, among other such options. In some cases a customer will want to establish a secure connection to the customer allocation 204. As illustrated in the configuration 200 of FIG. 2, a client device 102 associated with the customer can execute a secure communication client, such as a SSH client 202. The SSH client 202 can work with a corresponding secure component in the customer allocation 204, such as an SSH server 210 operating on a host resource in the customer allocation. The SSH client 202 can cause a secure channel to be established between the client device 102 and the SSH server 210 of the customer allocation 204. The encryption provided by the SSH connection enables sensitive data to be securely transmitted to the customer allocation 204 over the at least one network 104, which may have varying levels of security in at least some embodiments. SSH uses public key cryptography to authenticate the client device 102, or a user of the client device, among other such options. Authentication can be obtained in some embodiments through use of a public-private key pair. In many existing implementations TCP port 22 is assigned for SSH connections. An SSH client 202 can utilize an SSH daemon to establish the connection. Connections such as SSH connections can be advantageous in such environments as they can avoid certain security issues otherwise encountered when exposing allocated resources, such as virtual machines, across a network such as the Internet.

In order to provide such connectivity using conventional approaches, however, a provider might require specific SSH keys to be defined with per-user authentication and authorization. A given user would not have integrated access across all relevant instances. Some implementations can require customers to set up account-level shared SSH keys for use in accessing those instances. The various keys then need to be managed, however, and security distributed to the users who need access. The various users can then set up SSH clients using these keys to be able to access the relevant resource instances. The use of shared keys can make it difficult for administrators to determine active connections, as well as to audit which users accessed which instances. Revoking access for a user who already has possession of such a key can also involve replacing that key with a new key, as well as terminating and restarting all instances that used the prior key, which is less than optimal for multi-tenant systems.

Accordingly, approaches in accordance with various embodiments provide multi-tenant bastion host functionality that can be used to provide secure connection functionality for multiple customers across various instances and customer allocations. An SSH bastion service can be a customer-facing service that proxies customer (or other user) SSH traffic through one or more SSH host resources before routing the traffic to the relevant instances. Instead of each user having to have a single SSH key defined for use in per-user authentication and authorization, a bastion service can support connections directly from a customer allocation management console, or other such component. A customer accessing such a console can specify an instance and select an option to establish a secure connection to that instance. The bastion service can then handle the authentication and authorization steps, and ensure that all security requirements are satisfied before any data reaches the customer allocation. A bastion service as discussed herein can serve as an entry point for secure (e.g., SSH) traffic to customer resource allocations. A customer client can first establish an SSH connection to the bastion service, and an authentication can be performed using a public key stored for the customer. The customer can specify the target instance, such as through the command to be executed by the bastion service. An SSH server of the bastion service can then route the traffic to the target instance along a determined network path using, for example, port 22 for SSH traffic. A second SSH connection is then established from the client device through the bastion service and the determined network path to the SSH server executing on the target instance, providing end-to-end security of traffic from the client device to the target instance of the customer allocation.

Figure 3:
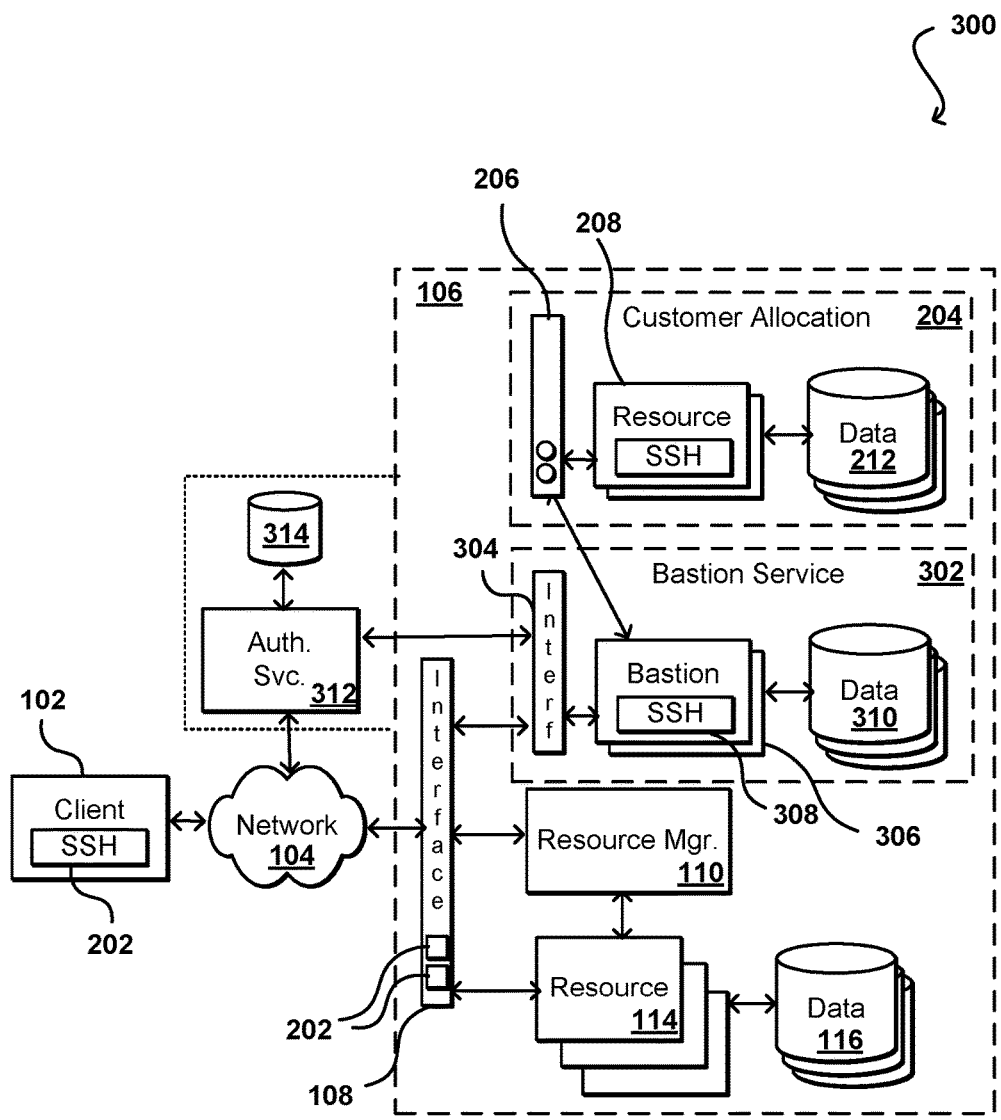
FIG. 3 illustrates a second example configuration for enabling an SSH connection between a client device and a customer resource that can be utilized in accordance with various embodiments.

FIG. 3 illustrates an example configuration 300 providing such a bastion service 302 that can be utilized in accordance with various embodiments. In this example, one or more interfaces 202, such as application programming interfaces (APIs), of an interface layer can enable a client device 102 to send a request over the network(s) 104 to be received by the resource provider environment 106 and directed to a bastion service 302. As mentioned, the bastion service 302 can be comprised of various components, including an interface layer with one or more service-specific interfaces, one or more host machines 306 hosting SSH servers 308, as well as various other host machines, virtual instances, data repositories 310, among other such options. The bastion service 302 can provide multi-tenant support across any or all customers of the resource provider environment 106, such as customers of a certain type, group, or role, customers having a certain level of access or permission, etc. In many conventional bastion implementations the bastion servers take the form of conventional hardware, such as Linux-based servers, where as much non-required software has been removed as possible. The bastion hosts 306 in this example instead execute custom software that directly implements the SSH protocol, such as through the use of third-party libraries. Only the components that are needed are added to the bare hardware. Further, the bastion hosts 306 are able to interface with the customer allocations 204 in order to enable connections to customer resource instances 208 that are not otherwise accessible to entities outside the resource provider environment 106.

In an example process, the SSH client 202 on a client device 102 can connect, through an SSH connection process, to the SSH bastion service 302. This can include the SSH client 202 submitting a request to an SSH daemon, executing on a bastion host 306 as part of the bastion service, that is configured to accept remote connections. The customer can provide, as part of the request or a separate communication, customer credentials such as a public customer key that is stored by the resource provider environment 106. The bastion host 306 can attempt to authenticate the customer credentials. In this example the bastion service 302 delegates the authentication decision to an authentication service 312, which can be part of, or separate from, the resource provider environment 106 as illustrated by the surrounding dotted line. The authentication service 312, or other such system or component, can receive the customer credentials and compare the customer credentials to credentials stored by, or known to, the authentication service, as may be stored in a credential repository 314 or other such location. Credentials may be digitally signed by a trusted entity in some embodiments in order to provide for the authentication. These customer credentials can be the same credentials used to gain access to resources or services in the resource provider environment 106, or may be other appropriate credentials associated with the customer entity requesting the access. In some embodiments the authorization can be somewhat granular, where a specified user or customer can obtain an SSH connections to specific instances, such as instances with specific tags or roles, or instances running a particular machine image or having a certain configuration, etc.

The bastion service 302 can receive an authentication decision from the authentication service 312. If the credentials cannot be authenticated for the customer then the request can be denied. If the credentials are authenticated, an authorization decision can also be made for the request. In the request the customer can have specified the resource instance 208 of the customer allocation 204 to which the client device wants to connect 102. The instance can be identified using any appropriate identifier or information, as may include an instance identifier, customer allocation address, public address, or other such identifier. The bastion service can contact a resource manager 110, control plane component (not shown), access manager (not shown), or other such system or service to determine whether the customer is authorized to connect to the target resource instance 208. The bastion service 302, once determining that the customer is authorized to connect to that instance, can publish the customer's public key using the credentials received and used to authenticate the request. In this example the bastion has access to the public key of the connecting user and has determined that the user is authorized to connect to the requested instance. Thus, the bastion can publish the public key to the physical machine hosting the target instance. The machine then stores a file that contains the public key that is to be used to connect to the instance. Control can then be returned to the customer's SSH client, which can connect through the established bastion tunnel to the port on the target instance. The public key can then be used for SSH authentication on the SSH server of the target instance.

The bastion service 302 determines a network path over the wire over which packets for the secure connection can be routed to the target resource instance 208. The service can utilize SSH tunneling, which can effectively route the stdin/stdout of the SSH connection to the port on the target instance. This effectively establishes a separate secure path between the bastion service 302 and the target resource instance 208. A second SSH connection can then be established between the client device 102 and the target resource instance 208 through the bastion service 302 and along the determined network path. The target resource instance 208 can retrieve the published customer SSH key during the authentication phase of the SSH connection in order to validate the connection. In this way, the connection is verified and user authorized and authenticated before any data for the request arrives at the target resource instance 208.

The bastion service 302 in this example includes a fleet of server instances that can be operated in an allocation similar to that of the customer allocation 204, in that it can function as a sub-network or virtual private network. The bastion service 302 can have downstream connectivity to the customer allocation 204, and the instances of the bastion service can be redundant across geographical boundaries to provide for fault tolerance. The bastion instances can be fronted by load balancers, such as standard Layer 4 load balancers, and operate an SSH daemon, such as may be based on Apache MINA SSHD. A customer identifier can be used for purposes such as capacity management and customer isolation, but the bastion hosts themselves are multi-tenant. The bastion hosts and load balancers can be tiered by customer profile in some embodiments. Once a customer authenticates to the relevant bastion SSH server 308 and provides the target instance identifier, the bastion frontend can query the customer allocation 204 to obtain relevant instance metadata. The frontend in this example can then establish a new connection to the target instance, at TCP port 22, by routing the traffic to the appropriate address for the customer allocation, as may include a specified interface of the allocation interface layer 206.

As mentioned, such connection capability through use of a bastion service 302 can enable customers to establish secure connections to their resource instances where the access can be managed using access policies already established for their resource allocation. A user associated with the customer can access a management console or other such interface and select an option to securely connect to a specified resource instance, and the bastion service can take care of performing the authentication and generating the connection, here through a pair of connections joined by the bastion service. The policies can grant permissions to establish SSH connections to specific instances, or all instances, associated with a customer allocation or otherwise accessible in the resource provider environment. Customers in some embodiments can also setup and use their personal SSH keys to connect to resource instances using any SSH clients. Account administrators can perform actions, through the bastion service, such as to audit SSH connections, revoke access for an individual user, and terminate a user's active connections. Account administrators can also grant SSH access and securely connect to resource instances in a customer allocation, even when these resource instances are not directly accessible from the Internet or another external network. In some embodiments SSH connections are automatically recorded in access logs, enabling auditing of access to resources, including who accessed a resource instance using an SSH connection and at what time. Revoking SSH access to a particular user is also supported, as the permission can be removed by detaching the policy or removing the user from the group that has the policy. Active connections for the revoked user can also be terminated from a management console or other such interface, as the connection from the user is to the bastion service and not directly to the resource instance.

In some embodiments the bastion host may not be able to establish a connection directly to port 22 (or another appropriate port or location) on the target instance because the instance is in a different resource allocation. The bastion host can instead make an outbound connection to a communication service that can encapsulate the connection request with the information about the port and target instance. The outgoing packets from the bastion host can then be routed by the communication service to the appropriate interface of the customer allocation, which can remove the encapsulation and pass the information to the port on the target resource instance such that the traffic appears as regular TCP traffic on the customer's resource allocation.

Figure 4:
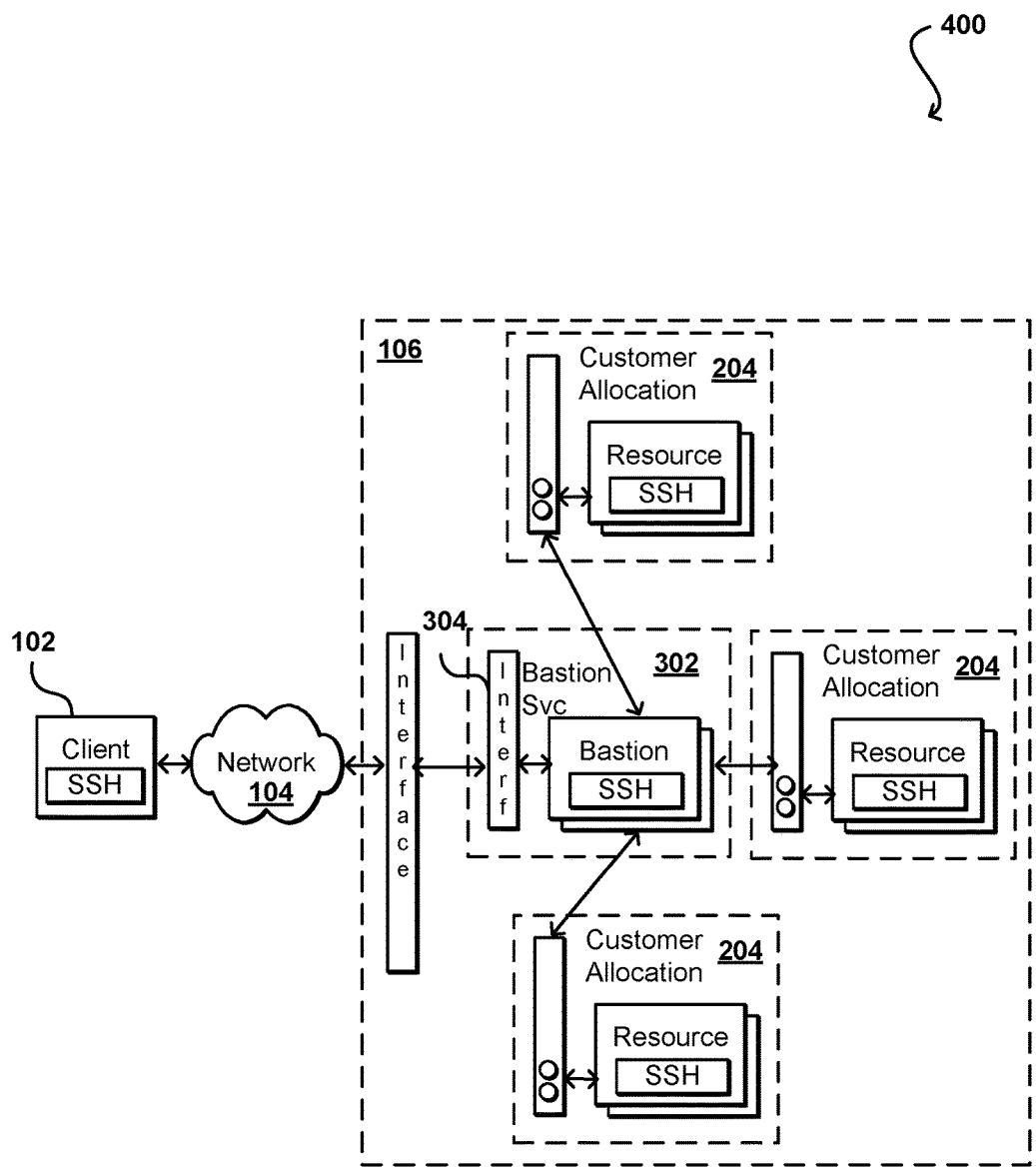
FIG. 4 illustrates an example approach to managing SSH connections for various customer allocations that can be utilized in accordance with various embodiments

In addition to enabling per-user logging and auditing of data, the use of a bastion service as discussed herein provides for a central enumeration to the customer of all active SSH connections. Various users will be connected through the bastion service to various resource instances in one or more customer allocations 204, as illustrated in the example configuration 400 of FIG. 4. Due to the multi-tenant nature of the bastion service 302, the allocations can include different allocations for the same customer or different customers, among other such options. A customer can obtain information about the current SSH connections for any or all relevant allocations, and can select to terminate any or all of those connections. The customer can select to terminate specific connections, all connections for a particular user, all connections to a particular instance, etc. In some embodiments the customer can make an API call to terminate any open SSH connections anywhere across a network or allocations, such as when an employee is terminated or otherwise changes roles or type of access.

Figure 5:
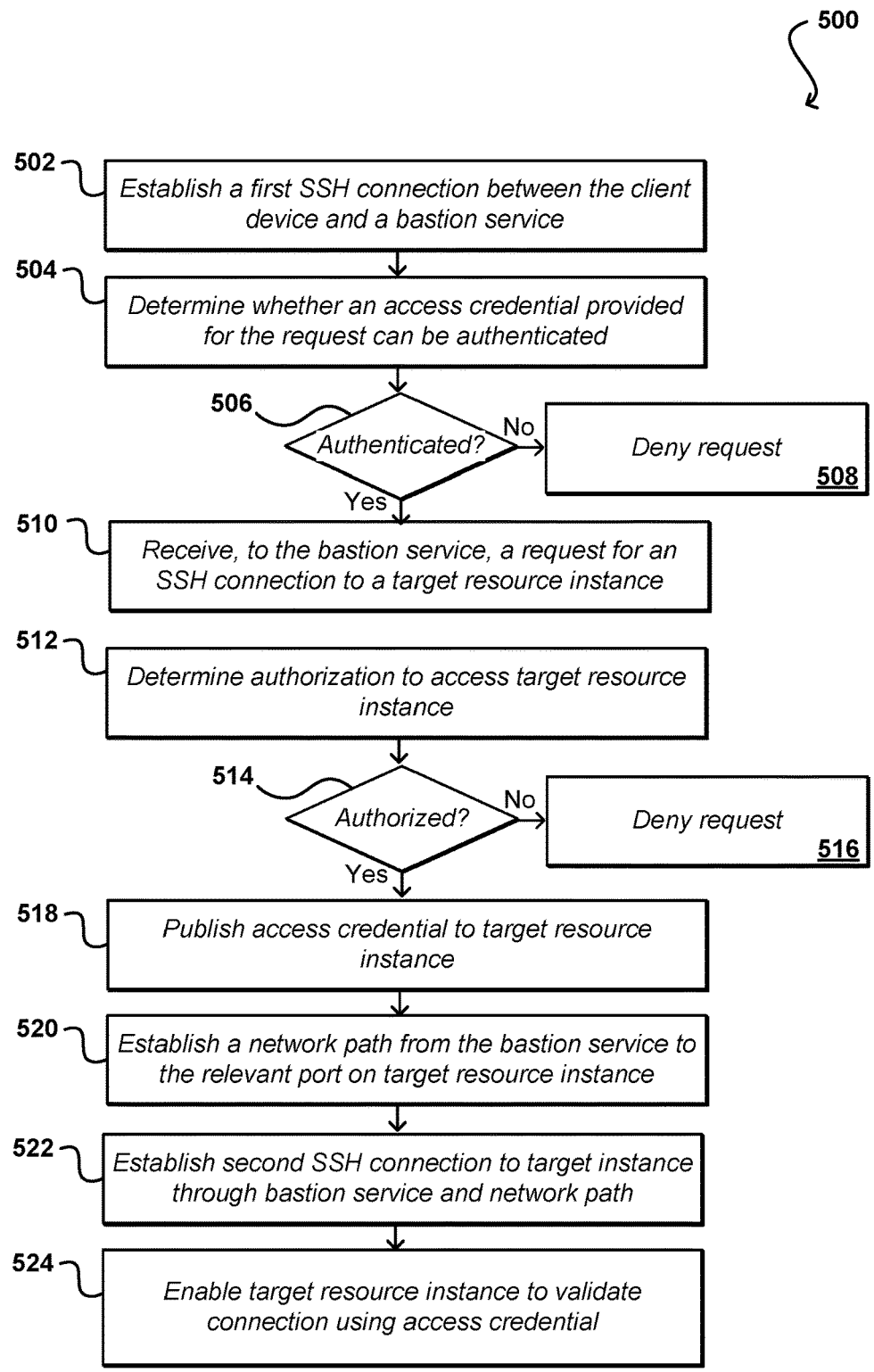
FIG. 5 illustrates an example process for managing SSH connections for a customer allocation that can be utilized in accordance with various embodiments.

FIG. 5 illustrates an example process 500 for managing secure connections via a bastion service that can be utilized in accordance with various embodiments. It should be understood for this and other processes discussed herein that there can be additional, alternative, or fewer steps performed in similar or alternative orders, or in parallel, within the scope of the various embodiments unless otherwise stated. In this example, a first SSH connection can be established 502 between the client device and the bastion service. The client device in this example will submit a request to establish the first connection to the bastion service, where that request will include a cryptographic key or other user access credential.

The bastion service can attempt to determine 506 whether the access credential (or set of credentials) associated with the request can be authenticated. The credentials can be a public cryptographic key transmitted with the request, for example, which can be compared against a private key previously obtained or determined for the customer or device requesting access. In at least some embodiments, the authentication can be delegated to an authentication service that is internal, or external, to the resource provider environment hosting the bastion service and the customer allocation. The bastion service can send the access credentials, which as mentioned elsewhere herein can be the same credentials used to access other resources in the resource provider environment in at least some embodiments. The authentication service can determine whether or not the credentials can be used to authenticate the source of the request, using any appropriate authentication process used to authenticate based on access credentials such as public cryptographic keys. The determination result can be returned to the bastion service, and if it is determined 506 that the credential unable to be successfully authenticated then the request can be denied 508. If the authentication was successful, an acknowledgement or other notification can be provided to the client device for the established first SSH connection. A subsequent request can be received 510 to establish an SSH channel to a target resource instance. An attempt can be made to determine 512 whether the source of the request is authorized to access, or communicate with, the target resource instance. It should be understood that the authentication and authorization steps can be performed in reverse order, or concurrently, within the scope of the various embodiments. The authorization decision can involve contacting an access manager, or other such system or service, to determine, based on a user identifier, target resource identifier, and/or other such information whether the user is authorized for such access according to one or more rules, policies, or other such guidelines. If the source is not authorized for the access then the request can be denied 516.

If the source of the request is determined 514 to be able to access the target resource instance then the access credential (e.g., customer key) used to obtain the access can be published 518 to the resource instance, or at least to a physical machine capable of hosting the instance. The bastion service can establish 520 a network path between the bastion service and the relevant port (e.g., port 22) on the target resource instance, such as by routing the SSH traffic to the port on the target instance through a tunneling or other such routing process as discussed and suggested elsewhere herein. A second SSH connection is then established 522 from the client device that passes through the bastion service and the network path to the target resource instance. The target resource instance is then enables 524 to retrieve the access credential, here the published SSH access key, during an authentication phase of the SSH connection process, and validate the connection in order to establish the second SSH communication connection between the client device and the target instance.

Figure 6:
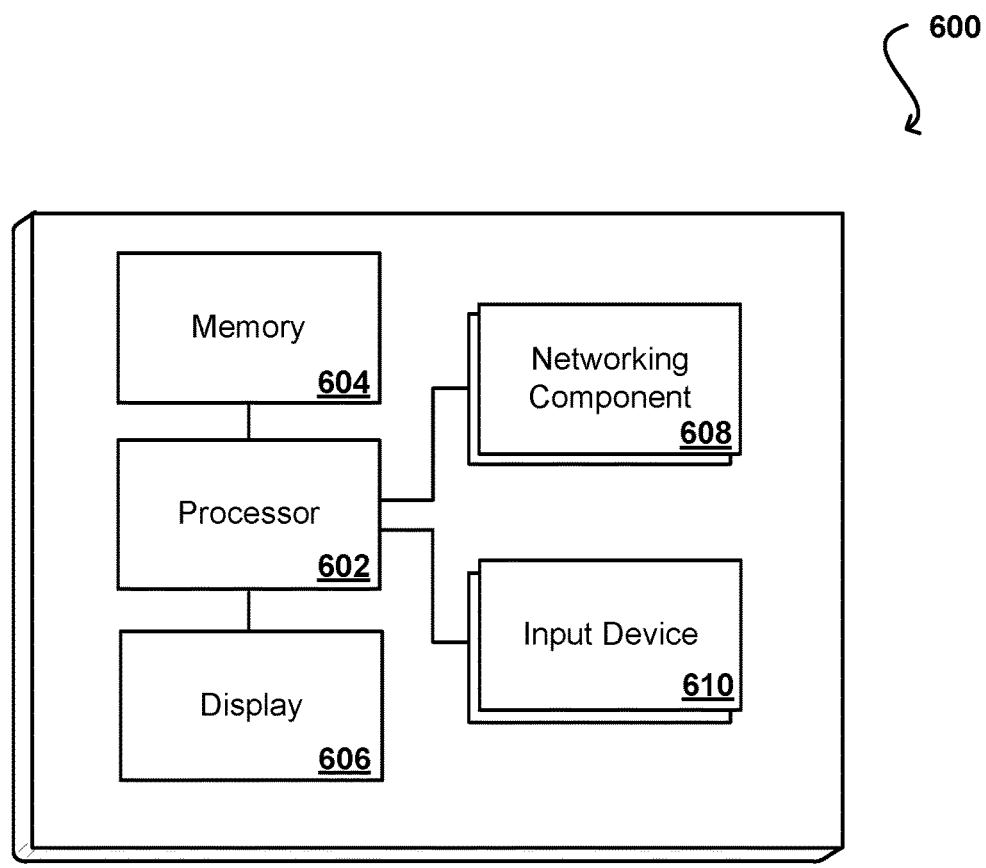
FIG. 6 illustrates example components of a computing device that can be used to implement aspects of the various embodiments.

FIG. 6 illustrates a set of basic components of an example computing device 600 that can be utilized to implement aspects of the various embodiments. In this example, the device includes at least one processor 602 for executing instructions that can be stored in a memory device or element 604. As would be apparent to one of ordinary skill in the art, the device can include many types of memory, data storage or computer-readable media, such as a first data storage for program instructions for execution by the at least one processor 602, the same or separate storage can be used for images or data, a removable memory can be available for sharing information with other devices, and any number of communication approaches can be available for sharing with other devices. The device may include at least one type of display element 606, such as a touch screen, electronic ink (e-ink), organic light emitting diode (OLED) or liquid crystal display (LCD), although devices such as servers might convey information via other means, such as through a system of lights and data transmissions. The device typically will include one or more networking components 608, such as a port, network interface card, or wireless transceiver that enables communication over at least one network. The device can include at least one input device 610 able to receive conventional input from a user. This conventional input can include, for example, a push button, touch pad, touch screen, wheel, joystick, keyboard, mouse, trackball, keypad or any other such device or element whereby a user can input a command to the device. These I/O devices could even be connected by a wireless infrared or Bluetooth or other link as well in some embodiments. In some embodiments, however, such a device might not include any buttons at all and might be controlled only through a combination of visual and audio commands such that a user can control the device without having to be in contact with the device.

As discussed, different approaches can be implemented in various environments in accordance with the described embodiments. As will be appreciated, although a Web-based environment is used for purposes of explanation in several examples presented herein, different environments may be used, as appropriate, to implement various embodiments. The system includes an electronic client device, which can include any appropriate device operable to send and receive requests, messages or information over an appropriate network and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network includes the Internet, as the environment includes a Web server for receiving requests and serving content in response thereto, although for other networks, an alternative device serving a similar purpose could be used, as would be apparent to one of ordinary skill in the art.

The illustrative environment includes at least one application server and a data store. It should be understood that there can be several application servers, layers or other elements, processes or components, which may be chained or otherwise configured, which can interact to perform tasks such as obtaining data from an appropriate data store. As used herein, the term "data store" refers to any device or combination of devices capable of storing, accessing and retrieving data, which may include any combination and number of data servers, databases, data storage devices and data storage media, in any standard, distributed or clustered environment. The application server can include any appropriate hardware and software for integrating with the data store as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server in the form of HTML, XML or another appropriate structured language in this example. The handling of all requests and responses, as well as the delivery of content between the client device and the application server, can be handled by the Web server. It should be understood that the Web and application servers are not required and are merely example components, as structured code discussed herein can be executed on any appropriate device or host machine as discussed elsewhere herein.

The data store can include several separate data tables, databases or other data storage mechanisms and media for storing data relating to a particular aspect. For example, the data store illustrated includes mechanisms for storing content (e.g., production data) and user information, which can be used to serve content for the production side. The data store is also shown to include a mechanism for storing log or session data. It should be understood that there can be many other aspects that may need to be stored in the data store, such as page image information and access rights information, which can be stored in any of the above listed mechanisms as appropriate or in additional mechanisms in the data store. The data store is operable, through logic associated therewith, to receive instructions from the application server and obtain, update or otherwise process data in response thereto. In one example, a user might submit a search request for a certain type of item. In this case, the data store might access the user information to verify the identity of the user and can access the catalog detail information to obtain information about items of that type. The information can then be returned to the user, such as in a results listing on a Web page that the user is able to view via a browser on the user device. Information for a particular item of interest can be viewed in a dedicated page or window of the browser.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated. Thus, the depiction of the systems herein should be taken as being illustrative in nature and not limiting to the scope of the disclosure.

The various embodiments can be further implemented in a wide variety of operating environments, which in some cases can include one or more user computers or computing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system can also include a number of workstations running any of a variety of commercially-available operating systems and other known applications for purposes such as development and database management. These devices can also include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, FTP, UPnP, NFS, and CIFS. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including HTTP servers, FTP servers, CGI servers, data servers, Java servers and business application servers. The server(s) may also be capable of executing programs or scripts in response requests from user devices, such as by executing one or more Web applications that may be implemented as one or more scripts or programs written in any programming language, such as Java®, C, C# or C++ or any scripting language, such as Perl, Python or TCL, as well as combinations thereof. The server(s) may also include database servers, including without limitation those commercially available from Oracle®, Microsoft®, Sybase® and IBM® as well as open-source servers such as MySQL, Postgres, SQLite, MongoDB, and any other server capable of storing, retrieving and accessing structured or unstructured data. Database servers may include table-based servers, document-based servers, unstructured servers, relational servers, non-relational servers or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch-sensitive display element or keypad) and at least one output device (e.g., a display device, printer or speaker). Such a system may also include one or more storage devices, such as disk drives, optical storage devices and solid-state storage devices such as random access memory (RAM) or read-only memory (ROM), as well as removable media devices, memory cards, flash cards, etc.

Such devices can also include a computer-readable storage media reader, a communications device (e.g., a modem, a network card (wireless or wired), an infrared communication device) and working memory as described above. The computer-readable storage media reader can be connected with, or configured to receive, a computer-readable storage medium representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and other non-transitory computer readable media for containing code, or portions of code, can include any appropriate media known or used in the art, such as but not limited to volatile and non-volatile, removable and non-removable media implemented in any method or technology for storage of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer-implemented method, comprising:
   establishing a first secure connection between a client device and a multi-tenant bastion host;
   determining, via the multi-tenant bastion host and based at least in part upon an access credential for a request, that an identity associated with the request is authenticated;
   determining that the client device is authorized to communicate with a target resource;
   providing, from the multi-tenant bastion host, the access credential to the target resource; and
   providing a second secure connection between the client device and the target resource within the resource provider environment, the second secure connection maintained within the resource provider environment and passing through the multi-tenant bastion host along a determined network path between the multi-tenant bastion host and the target resource, wherein the target resource is able to validate the second secure connection based at least in part upon the access credential.

2. The computer-implemented method of claim 1, further comprising:
   identifying the target resource from a customer allocation provided using a plurality of resources of a resource provider environment, wherein the access credential is a cryptographic key enabling the customer to be authenticated for access to other resources in the resource provider environment.

3. The computer-implemented method of claim 2, further comprising:
   determining at least one access policy for the customer allocation in the resource provider environment; and
   determining that the identity associated with the request is authorized to communicate with the target resource per the at least one access policy.

4. The computer-implemented method of claim 1, further comprising:
   enabling the request to be generated using a command console, the command console capable of providing an identifier for the target resource and further providing a selectable option to establish the secure connection to the target resource.

5. The computer-implemented method of claim 1, wherein the secure connection is a secure shell (SSH) connection.

6. The computer-implemented method of claim 1, further comprising:
   providing, by the multi-tenant bastion service, the access credential to an authentication service capable of authenticating the identity associated with the request; and
   receiving, to the multi-tenant bastion service, an authentication result from the authentication service.

7. The computer-implemented method of claim 1, further comprising:
   enabling a customer associated with the target resource to obtain information for any active secure connection to the target resource, or to any other resource associated with a customer allocation, through the multi-tenant bastion service.

8. The computer-implemented method of claim 7, further comprising:
   enabling the customer to terminate any of the active secure connections through the multi-tenant bastion service.

9. The computer-implemented method of claim 7, further comprising:
   generating a log entry for each secure connection established for the customer allocation, wherein an audit process is able to analyze a connection log including the log entry for purposes of determining a source and timing of the secure connections for the customer allocation.

10. The computer-implemented method of claim 1, wherein the target resource is part of a virtual private network to which the client device is unable to establish a direct connection.

11. A system, comprising:
    at least one processor; and
    memory including instructions that, when executed by the at least one processor, cause the multi-tenant bastion host to:
       establish a first secure connection between a client device and a multi-tenant bastion host;
       determine, via the multi-tenant bastion host and based at least in part upon an access credential for a request, that an identity associated with the request is authenticated;

determine that the client device is authorized to communicate with a target resource;

provide, from the multi-tenant bastion host, the access credential to the target resource; and provide a second secure connection between the client device and the target resource within the resource provider environment, the second secure connection maintained within the resource provider environment and passing through the multi-tenant bastion host along a determined network path between the multi-tenant bastion host and the target resource, wherein the target resource is able to validate the second secure connection based at least in part upon the access credential.

12. The computer-implemented method of claim 11, further comprising:

identifying the target resource from a customer allocation provided using a plurality of resources of a resource provider environment, wherein the access credential is a cryptographic key enabling the customer to be authenticated for access to other resources in the resource provider environment.

13. The computer-implemented method of claim 12, further comprising:

determining at least one access policy for the customer allocation in the resource provider environment; and determining that the identity associated with the request is authorized to communicate with the target resource per the at least one access policy.

14. The computer-implemented method of claim 11, further comprising:

enabling the request to be generated using a command console, the command console capable of providing an identifier for the target resource and further providing a selectable option to establish the secure connection to the target resource.

15. The computer-implemented method of claim 11, wherein the secure connection is a secure shell (SSH) connection.

16. The computer-implemented method of claim 11, further comprising:

providing, by the multi-tenant bastion service, the access credential to an authentication service capable of authenticating the identity associated with the request; and receiving, to the multi-tenant bastion service, an authentication result from the authentication service.

17. The computer-implemented method of claim 11, further comprising:

enabling a customer associated with the target resource to obtain information for any active secure connection to the target resource, or to any other resource associated with a customer allocation, through the multi-tenant bastion service.

18. The computer-implemented method of claim 17, further comprising:

enabling the customer to terminate any of the active secure connections through the multi-tenant bastion service.

19. The computer-implemented method of claim 17, further comprising:

generating a log entry for each secure connection established for the customer allocation, wherein an audit process is able to analyze a connection log including the log entry for purposes of determining a source and timing of the secure connections for the customer allocation.

20. The computer-implemented method of claim 11, wherein the target resource is part of a virtual private network to which the client device is unable to establish a direct connection.

* * * * *